United States Patent Office 3,039,213
Patented June 19, 1962

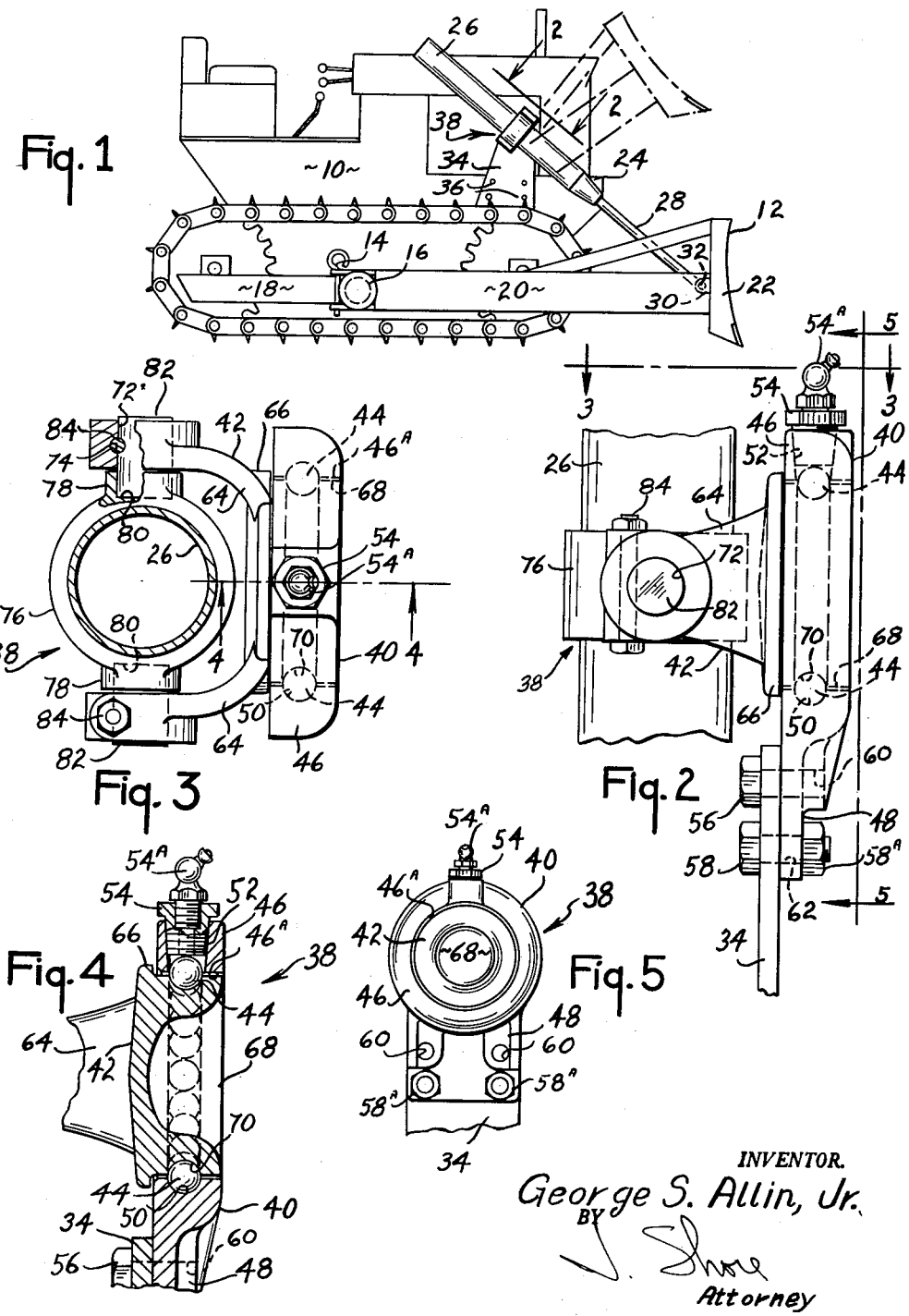

3,039,213
GIMBAL MOUNTED HYDRAULIC CYLINDER
George S. Allin, Jr., Green Bay, Wis., assignor to J. I. Case Company, Racine, Wis., a corporation of Wisconsin
Filed Dec. 12, 1960, Ser. No. 75,191
7 Claims. (Cl. 37—144)

This invention relates generally to tractor mounted earth working equipment, and more particularly to a gimbal arrangement for mounting the hydraulic lift mechanism employed to raise and lower the earth working equipment.

In the past, various types of mounting arrangements have been applied to the hydraulic lift cylinders for tractor mounted earth working equipment, such as bulldozers, but they have not been entirely satisfactory for a number of reasons. For example, some types have limited the movement of the cylinder assembly thereby restricting the working range of the bulldozer blade, while other types have created uneven stress distribution in the cylinder assembly resulting in cylinder damage. Gimbal type mounting assemblies, previously provided, have required complicated devices for their attachment to the supporting framework of the tractor.

Therefore, it is the object of this invention to provide a simple, efficient, and self-contained gimbal type mounting assembly for the hydraulic lift cylinder of a tractor mounted earth working attachment whereby the lift cylinder will have unrestricted rotational movement relative to the supporting framework, and the mounting assembly can be readily secured to any suitable frame member on the tractor without undue complication.

Other objects and advantages of this invention will be apparent from the following detailed specification and drawings of which, FIG. 1 is a side elevational view of a tractor mounted bulldozer embodying the present invention;

FIG. 2 is an enlarged view of the invention taken on line 2—2 of FIG. 1, with parts broken away;

FIG. 3 is a top view of the invention taken on line 3—3 of FIG. 2, with parts broken away;

FIG. 4 is a cross sectional view of the invention taken on line 4—4 of FIG. 3; and FIG. 5 is a rear view of the invention, in reduced scale, taken on line 5—5 of FIG. 2.

Generally stated, this invention is practiced by mounting the lift cylinder for tractor mounted earth working equipment on an improved gimbal type mounting assembly that is secured to the framework on the tractor, and which will allow pivotal movement of the cylinder relative to the mounting assembly, and rotational movement of the cylinder relative to the tractor during its operation in raising and lowering the earth working machinery.

Referring now to the drawings, it will be seen in FIG. 1 that the present invention is mounted on a crawler type tractor 10. A bulldozer assembly 12 is pivotally secured to the tractor 10 by means of a clevis and pin arrangement 14 surrounding a mounting stud 16 which is secured to a tractor frame member 18. Bulldozer 12 is of a conventional type and includes a pair of forwardly extending push arms 20, and a transversely extending blade 22. A hydraulic lift cylinder 24 is positioned on each side of the tractor to raise and lower the bulldozer assembly 12, and includes a cylinder 26 and a piston (not shown) and rod assembly 28. The hydraulic lift cylinder 24 is attached to the bulldozer 12 by brackets 30 which are welded to the rear side of the blade 22, and piston rod assemblies 28 are pivoted thereto by pins 32. An upstanding frame member 34 is rigidly secured to the tractor's main frame by bolts 36, and is provided for positioning of the hydraulic lift cylinders 24 on the tractor 10. Since the associated parts of the bulldozer assembly and the hydraulic lift mechanism are identical on each side of the tractor, it is felt that it is necessary only to illustrate and describe the parts on one side of the tractor, in order to fully explain and understand the invention.

Referring now to FIG. 2, the cylinder 26 is supported on the tractor 10 by a gimbal type mounting assembly generally designated as 38 which is bolted to the tractor frame member 34. The gimbal mounting 38 includes a bracket member 40, a yoke-shaped movable member 42, and a plurality of bearing elements 44. In the present embodiment of the invention, the bearing elements are in the form of balls, but it is within the scope of this invention to use other types of bearing elements, such as rollers. The bracket member 40 is a particularly formed casting which defines an annular portion 46, and a flat plate portion 48. The annular portion 46 is provided with an annular bearing groove 50 around its inter-periphery 46$^a$ which serves as the outer bearing raceway for bearing elements 44, as will be hereinafter explained. A suitably threaded aperture 52 is defined in the annular portion 46 to receive a reducer bushing 54 and a conventional grease fitting 54$^a$. The flat plate portion 48 and the bolts 56 and 58 serve to secure the mounting assembly 38 to the tractor frame member 34, which is provided with cooperating bolt holes (see FIGS. 2 and 5). Bolt holes 60 and 62 are provided in the bracket member 40 for receiving bolts 56 and 58, and in the present instance, the bolt holes 60 are suitably threaded to retain bolts 56, while bolts 58 pass through the holes 62 and are retained therein by nuts 58$^a$. It can be appreciated that this is merely one manner for securing the gimbal assembly 38 to the tractor frame, and that other methods could be utilized to secure the plate 48 to the tractor frame.

The yoke-shaped movable member 42 comprises a pair of arms 64, FIG. 3, a circular flange portion 66, and a cylindrical shank portion 68. It will be noted that the shank portion 68 is of a diameter slightly less than that of the opening or internal periphery 46$^a$ of the annular portion 46 of bracket 40, and is provided with an annular bearing groove 70 which serves as the inner bearing raceway for bearing elements 44, as will be hereinafter explained. The yoke arms 64 project from the flange 66 and define axially aligned apertures 72. Bolt holes 74 are also defined in the arms 64 and are disposed adjacent the apertures 72, and their axes are positioned normal to the axes of apertures 72. The circular flange 66 is of a diameter larger than the cylindrical shank 68 and the opening 46$^a$ of the bracket 40, and is provided to protect the bearing elements 44 and their associated raceways or grooves 50 and 70 from dirt and debris when the gimbal mounting is assembled and in operation.

The cylinder 26 has a collar 76 suitably secured thereto, and of a size to fit between the arms 64 of the movable member 42 (see FIG. 3). The collar 76 is provided with cylindrical bosses 78 which define axially aligned recesses 80. The recesses 80 are of the same diameter as the apertures 72 in the arms 64 and are provided to receive a pair of suitable shafts 82. The stub shafts 82 retain the cylinder 26 in predetermined relation to the yoke arms 64 while allowing pivotal movement of the cylinder 26 relative to the yoke arms 64, as seen in FIGS. 2 and 3. It will be noted that the shafts 82 are cylindrical in configuration and define grooves proximate their outer ends. When the unit is assembled, these grooves and the nut and bolt assemblies 84 are utilized to retain the shafts 82 in the recesses 80 and the apertures 72 of the yoke arms 64.

The gimbal mounting unit and associated parts are assembled in the following manner:

The shank 68 of the U-shaped yoke member 42 is inserted in the annular portion 46 of the bracket member 40, and the raceways 50 and 70 are brought into alignment. It will be seen that the flange portion 66 of the yoke member 42 helps in attaining this alignment by restricting the inward movement of the shank 68. A plurality of bearing elements 44 is then fitted into the cavity between the raceways 50 and 70 through the threaded aperture 52 until they are stationed adjacent one another. It can now be seen that the two parts of the mounting assembly 38, the yoke member 42 and the bracket 40 and their associated parts, the shank portion 68 and the annular portion 46 respectively, are positioned concentric to one another, and while they are free to rotate relatively to one another on the bearing elements 44, they are restricted from axial movement or separation by the bearing elements 44. The reducer bushing 54 and conventional grease fitting 54a are then screwed into the threaded aperture 52, and in this manner they serve as a closure to retain the bearing elements 44 in the raceways 50 and 70. The grease fitting 54a is utilized to provide lubrication to the bearing elements 44, and to flush out any dust or debris which might enter the bearing area during operation. The assembled gimbal mounting is then secured to the frame member 34 by bolts 56 and 58 and nuts 58a. The cylinder 26 is positioned between the arms 64 of the yoke member 42, and the cylindrical bosses 78 of the collar 76 are brought into alignment with the apertures 72. The stub shafts 82 are inserted through the apertures 72 and are seated in the bearing recesses 80 of the cylindrical bosses 78. It will be noted that the shafts 82 are positioned so that the grooves in the shafts 82 are in alignment with apertures 74, and a bolt and nut 84 is inserted in each of the apertures 74 to retain the shafts 82 in the arms 64. Thus the cylinder is free to pivot laterally about the axis of the shafts 82, but is retained within the yoke arms of the mounting assembly 38.

It can be appreciated that herein is described a new and novel mounting assembly for a hydraulic cylinder which provides unrestricted 360 degrees rotational movement of the cylinder relative to the supporting framework and allows lateral pivoting of the cylinder relative to the mounting assembly. In addition to these features, the bearing means which provides friction-free rotational movement for the cylinder, serves as the coupling means to retain the parts of the mounting assembly together. Also the entire mounting assembly can be secured to any suitable framework on the tractor without undue complication or requiring special fittings to accommodate it.

While only one embodiment has been described specifically, it will be apparent to those skilled in the art, that alterations and substitution of the mechanical equivalents may be made. For example, the mounted arrangement described is not limited exclusively to use with a bulldozer assembly, but it can be utilized for mounting the hydraulic actuating cylinder for any type of equipment merely by providing suitable bolt holes in the support framework.

What I claim as new and desire to secure by Letters Patent of the United States is:

1. A mounting assembly for movably affixing a hydraulic cylinder to a supporting structure including a bracket member secured to the supporting structure, the bracket member defining an opening, a movable member adapted to be rotatably disposed within said opening, the movable member having yoke arms, cooperating means interconnecting the cylinder and the yoke arms for allowing pivotal movement of the cylinder relative to the yoke arms, the movable member and the bracket member defining a single pair of cooperating annular coplanar, coaxial bearing groove race portions, and bearing means engaged within said grooves in position to secure said race portions against movement out of said co-planar, coaxial relation whereby the movable member may have rotational movement relative to the bracket member and the supporting structure while being restricted against any other movement by the bearing means in cooperation with said single pair of grooves.

2. A mounting assembly for movably affixing a hydraulic cylinder to a supporting structure including a bracket member secured to the supporting structure, the bracket member defining an opening, a movable member adapted to be rotatably disposed within said opening, the movable member having yoke arms, cooperating means interconnecting the cylinder and the yoke arms for allowing pivotal movement of the cylinder relative to the yoke arms, the movable member and the bracket member defining a single pair of cooperating annular co-planar, coaxial bearing grooves, one of the members defining an aperture in communication with the bearing grooves, a plurality of bearing elements engaged within said grooves in position to secure said bearing grooves in said co-planar, coaxial relation, and closure means within the aperture to retain the bearing elements within the bearing grooves whereby the movable member may rotate relative to the bracket member and the supporting structure while being restricted against axial movement by the bearing elements.

3. A mounting assembly for movably affixing a hydraulic cylinder to a supporting structure including a bracket member secured to the supporting structure, the bracket member defining an opening, a movable member adapted to be rotatably disposed within said opening and having yoke arms defining axially aligned apertures, the cylinder being provided with recesses positioned in axial alignment with the apertures in the yoke arms, stub shafts located within the yoke arm apertures and the cylinder recesses to retain the cylinder in axially fixed relation to the yoke arms while allowing pivotal movement of the cylinder relative to the yoke arms, the movable member and the bracket member defining a single pair of cooperating annular co-planar, coaxial bearing grooves, the bracket member defining an aperture in communication with the bearing grooves, a plurality of bearing elements engaged within said grooves, and closure means within the aperture to retain the bearing elements within the bearing grooves whereby the hydraulic cylinder may oscillate relatively to the bracket member and the supporting structure while being restricted against axial movement by the bearing elements, movable member and bracket member.

4. In a combination of a tractor and an earth working attachment, including a hydraulic ram for actuating the earth working attachment, the hydraulic ram having a cylinder and being mounted on the tractor and secured to the earth working attachment, the improvement comprising a mounting assembly for movably affixing the hydraulic ram cylinder to a frame member of the tractor including a bracket member secured to the frame member, the bracket member defining an opening, a movable member adapted to be rotatably disposed within said opening, the movable member having yoke arms defining axially aligned apertures, the cylinder being provided with recesses positioned in axial alignment with the apertures in the yoke arms, stub shafts located within the yoke arm apertures and the cylinder recesses to retain the cylinder in fixed axial relation to the yoke arms while allowing pivotal movement of the cylinder relative to the yoke arms, the movable member and the bracket member defining a single pair of cooperating annular co-planar, coaxial bearing grooves, one of the members defining an aperture in communication with the bearing grooves, a plurality of bearing elements engaged within said grooves, and closure means within the aperture to retain the bearing elements within the bearing grooves whereby the hydraulic ram may rotate relative to the bracket member and the supporting structure while being restricted against axial movement by the bearing elements, the movable member and the bracket member.

5. In an earth working implement of the type including a tractor, a movable earth engaging tool mounted thereon, and extensible and retractable means for moving the tool in relation to the tractor; the improvement comprising spaced pivot means on the extensible means having a pivotal axis substantially normal to the direction of extension of said extensible means, a yoke member pivotally supporting said pivot means and disposed generally between said extensible means and the tractor body, a single annular bearing race portion fixed in relation to said yoke member, a relatively stationary bearing race portion fixed in relation to said tractor and co-planar with the first-mentioned bearing race portion, and a plurality of rolling bearing elements engaged with both of said bearing races in position to maintain said races in co-planar alignment, said co-planar bearing races and said rolling bearing elements constituting the sole connection between said tractor and said yoke member.

6. In an earth working implement of the type including a tractor, a movable earth engaging tool mounted thereon, and extensible and retractable means for moving the tool in relation to the tractor; the improvement comprising spaced pivot means on the extensible means having a pivotal axis substantially normal to the direction of extension of said extensible means, a yoke member pivotally supporting said pivot means and disposed generally between said extensible means and the tractor body, a single semi-toric bearing race portion fixed in relation to said yoke member, a relatively stationary semi-toric bearing race portion fixed in relation to said tractor and co-planar with the first-mentioned bearing race portion, and a plurality of ball bearing elements engaged with both of said bearing races in position to maintain said races in co-planar alignment, said co-planar bearing races and said ball bearing elements constituting the sole connection between said tractor and said yoke member.

7. In an earth working implement of the type including a tractor, a movable earth engaging tool mounted thereon, and extensible and retractable means for moving the tool in relation to the tractor; the improvement comprising spaced pivot means on the extensible means having a pivotal axis substantially normal to the direction of extension of said extensible means, a yoke member pivotally supporting said pivot means and disposed generally between said extensible means and the tractor body, a single annular bearing race portion fixed in relation to said yoke member and offset relatively to said pivot means, a relatively stationary bearing race portion fixed in relation to said tractor and co-planar with the first-mentioned bearing race portion, said bearing races being disposed generally in a plane substantially parallel to the pivotal axis of said pivot means, and a plurality of rolling bearing elements engaged with both of said bearing races in position to maintain said races in co-planar alignment, said co-planar bearing races and said rolling bearing elements constituting the sole connection between said tractor and said yoke member.

References Cited in the file of this patent

UNITED STATES PATENTS 2,973,592     Abel _____ Mar. 7, 1961

FOREIGN PATENTS 104,415     Great Britain _____ Mar. 8, 1917